United States Patent [19]

Osborn

[11] Patent Number: 4,640,154
[45] Date of Patent: Feb. 3, 1987

[54] EPICYCLIC POWER TRANSMISSION

[76] Inventor: Merritt A. Osborn, 8706 Cedar Rd., Chesterland, Ohio 44026

[21] Appl. No.: 530,733

[22] Filed: Sep. 9, 1983

[51] Int. Cl.$^4$ .............................................. F16H 1/28
[52] U.S. Cl. ......................................... 74/805; 74/804
[58] Field of Search .................... 74/804, 805; 474/164

[56] References Cited

U.S. PATENT DOCUMENTS

| 449,900 | 4/1891 | Clemons | 74/805 |
|---|---|---|---|
| 1,770,035 | 7/1930 | Heap et al. | 74/805 |
| 1,910,777 | 5/1933 | Soddy | 74/804 |
| 2,508,121 | 5/1950 | McIver | 74/804 |
| 3,013,447 | 12/1961 | Hils et al. | 74/805 |
| 3,307,434 | 3/1967 | Kope | 74/804 |
| 3,710,635 | 1/1973 | Whitehorn | 74/805 X |
| 3,726,158 | 4/1973 | Brown | 74/804 |
| 4,088,306 | 5/1978 | Falkner | 74/804 X |
| 4,297,920 | 11/1981 | Richter | 74/804 |
| 4,307,630 | 12/1981 | Osborn et al. | 74/805 |

FOREIGN PATENT DOCUMENTS

| 471170 | 1/1929 | Fed. Rep. of Germany | 74/804 |
|---|---|---|---|
| 519862 | 3/1931 | Fed. Rep. of Germany | 74/804 |
| 2002614 | 10/1970 | Fed. Rep. of Germany | 74/805 |
| 1053098 | 1/1954 | France | 74/805 |
| 1145266 | 3/1969 | United Kingdom | 74/805 |

Primary Examiner—Leslie A. Braun
Assistant Examiner—Joseph M. Rolnicki

[57] ABSTRACT

An improved epicyclic power transmission is disclosed. An input shaft is journalled on a torque plate. Gears are mounted on eccentrics on the input shaft. Chain connects the gears to the torque plate to prevent rotation of the gears but permit gyration of the gears. The chain also connects the gears to an output shaft whereby the gyratory motion of the gears is translated to rotation of the output shaft on an increased torque and reduced speed.

2 Claims, 11 Drawing Figures

EPICYCLIC POWER TRANSMISSION

BACKGROUND OF THE INVENTION

This invention relates generally to epicyclic power transmissions, and more particularly to such power transmissions wherein gear means are eccentrically mounted and journalled for gyration about a common axis and connected to a torque arm or plate to prevent rotation, yet permit torque transmission, through appropriate means, such as chain to an output shaft.

U.S. Pat. Nos. 3,726,158 and 3,013,447 each describe eccentric Torque Transmissions, utilizing eccentric motion, but neither teach nor suggest the eccentric mounting of a plurality of gear means for gyrating motion, with the throws being equally spaced for efficient operation.

SUMMARY OF THE INVENTION

According to the present invention an improved epicyclic power transmission is provided. The transmission includes a torque plate or torque arm, and an input shaft journalled for rotation. A plurality of gears are eccentrically mounted on the input shaft, and are interconnected to each other and to the torque arm to prevent rotation of the gears but permit gyration of the gears about a common axis and to translate the gyration to an increased torque output.

DESCRIPTION OF THE DRAWINGS

FIG. 3 is a detail view of a portion of FIG. 1 showing the interconnection of the gears;

FIG. 4 is a detail view similar to FIG. 3 of another embodiment of the driving interconnection of the gears;

FIG. 5 is a detail view of yet another embodiment of a driving interconnection of the gears;

DESCRIPTION OF THE PREFERRED EMBODIMENTS

Figure 1:
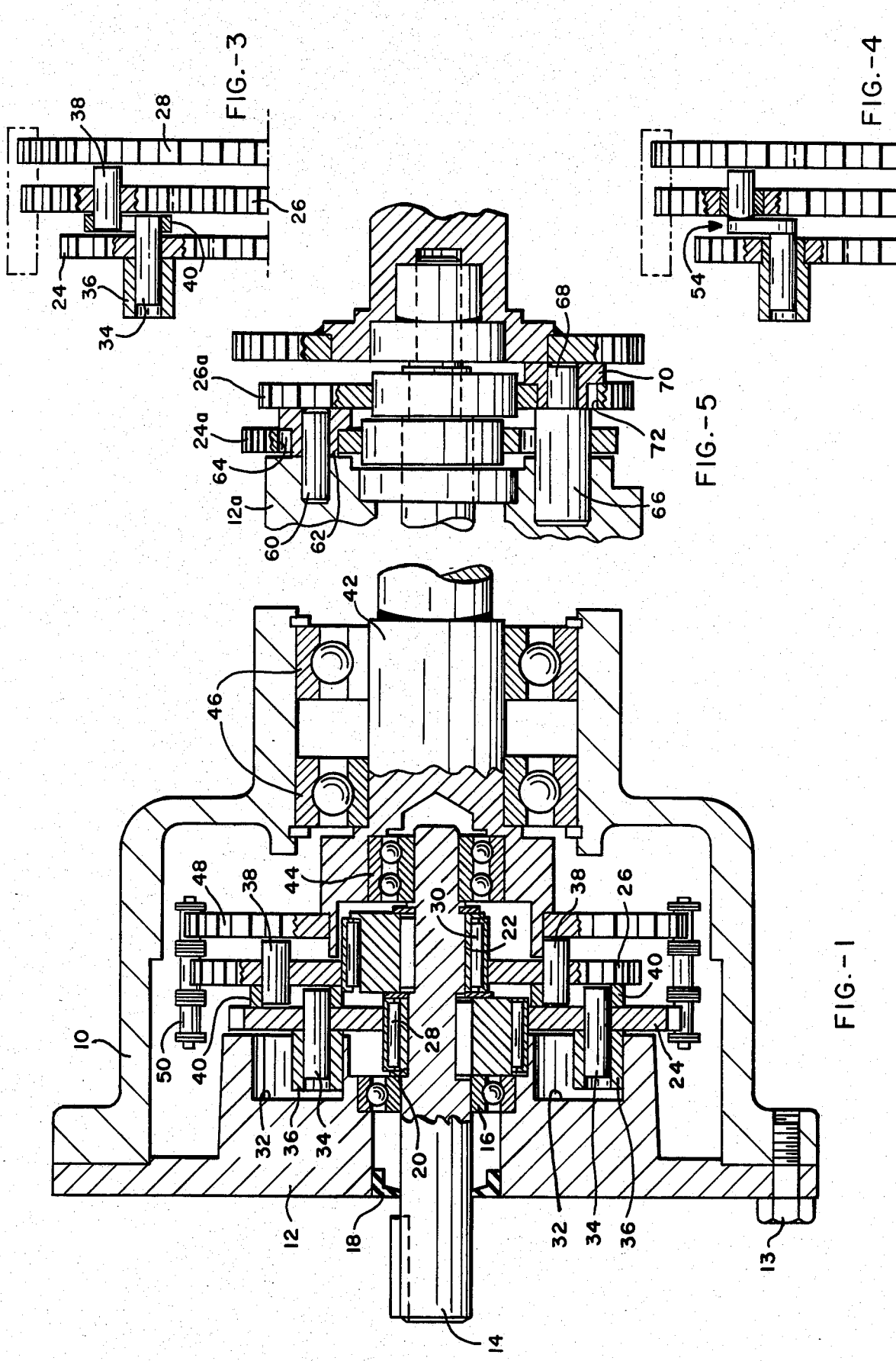
FIG. 1 is a longitudinal sectional view of one embodiment of a power transmission according to this invention.
Figure 2:
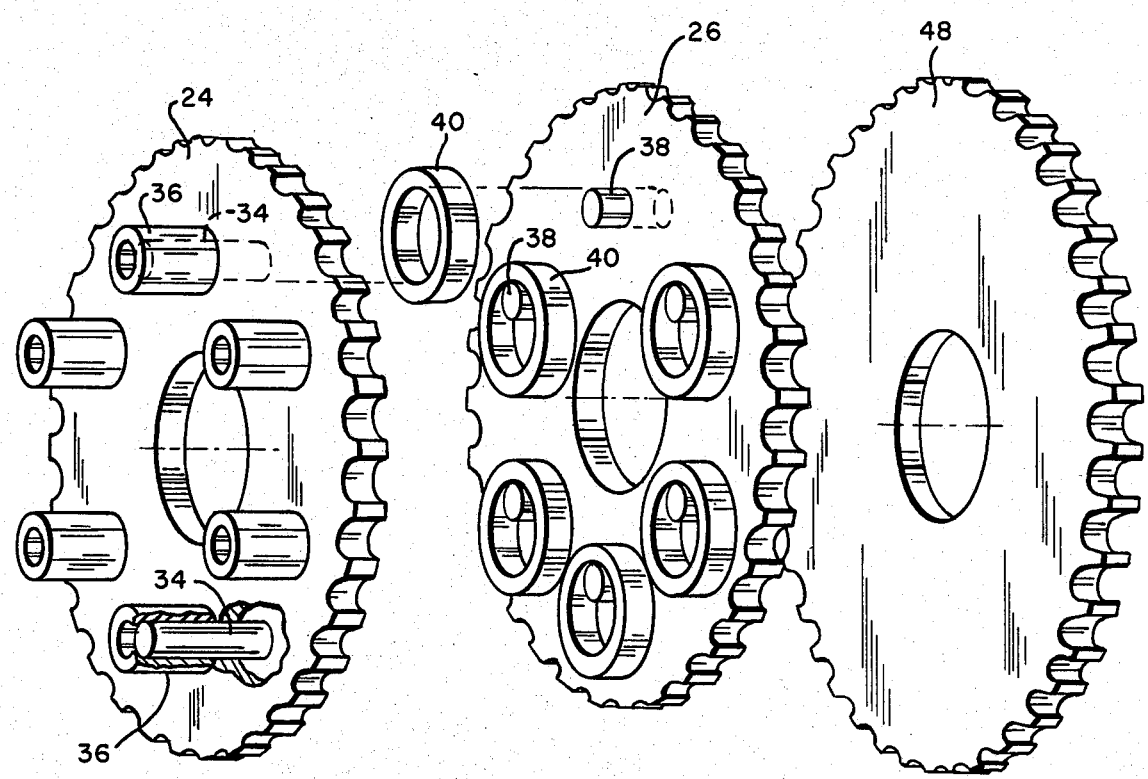
FIG. 2 is a perspective exploded view of the gears of FIG. 1.

Referring now to the drawings, and for the present to FIGS. 1, 2 and 3, one embodiment of a power transmission according to the present invention is shown. The transmission includes a housing 10, having a torque plate or torque arm 12 secured to one end thereof by bolts, one of which is shown at 13. An input shaft 14 extends through the torque plate 12 into the housing 10, and is journalled in the plate 12 by bearing 16, and sealed by seal 18.

The input shaft 14 is provided with a pair of axially spaced eccentrics 20 and 22 on which are journalled a pair of gears 24 and 26 respectively by a pair of bearings 28 and 30 respectively. The eccentrics 20 and 22 have their throws spaced by about 180°; i.e. they are essentially equally spaced on the input shaft 14.

The torque plate 12 is provided with six circumferentially spaced cylindrical recesses, two of which are shown at 32, and which are equally spaced from each other.

The gear 24 is provided with six circumferentially spaced pins 34 mounted thereon and extending therethrough. Bushings 36 are provided on one end of each of pins 34 and extend with pins 34 into the recesses 32, and bear against the cylindrical side walls of the recesses. The diameter of each of the recesses 32 is larger than the diameter of the bushings 36.

The gear 26 is also provided with six circumferentially equally spaced pins 38, which are axially offset with respect to the pins 34. The pins extend on both sides of the gear 26. Six annular rings 40 are provided and are arranged to journal, on their interior surfaces, the ends of pins 34 and 38 which are adjacent to each other on their respective gears 24 and 26.

Extending from within the housing 10 is an output shaft 42 which is journalled on the end of the input shaft 14 by bearing 44 and on the housing 10 by bearings 46. An output gear 48 is rigidly secured to the shaft 42.

A three stand chain 50 circumferentially engages the teeth of the gears 24, 26 and 48 to provide a driving interconnection therebetween.

In operation, a rotary input of the input shaft 14 is translated into a gyratory motion of the gears 24 and 26 with respect to the centerline of the shaft 14 by action of the pins 34, 38, the rings 40, bushing 36 and recesses 32. This motion will cause the gears 24 and 26 to drive the chain 50 at a reduced speed and increased torque. The chain 50 also being connected to the output gear 48, which is concentric with the centerline of the output shaft 42, will rotatably drive the output shaft 42 at the increased power, decreased speed from the input shaft.

FIGS. 4 through 11 show other embodiments of the invention.

FIG. 4 shows an embodiment where unitary crank arms 54 interconnect the gears 24 and 26. This eliminates the need for separate pins and interconnecting rings. The remainder is the same including bushings 36 which ride in recesses (not shown).

In FIG. 5 the six circumferentially spaced pins are provided in two sets of pin assemblies, each having three or more pins. In one of the sets each assembly includes a pin 60 secured to torque plate 12a and surrounded by a bushing 62. The bushing 62 rides in a circular opening 64 in gear 24a. In the other set an enlarged pin 66 is secured to the torque plate 12a, passes through one of the openings 64 and has a reduced end 68 surrounded by a bushing 70, the bushing 70 riding in circular opening 72 in the gear 26a. This arrangement provides the same type of gyratory movement as the arrangement in FIGS. 1 through 3 and FIG. 4.

Figure 6:
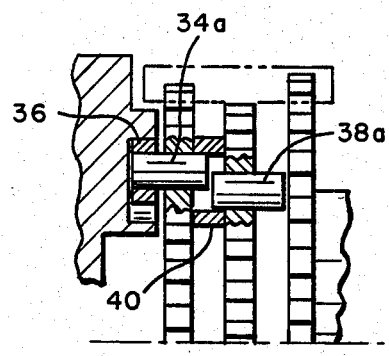
FIG. 6 is a detail view of a slightly modified form of the driving connection of FIG. 3.
Figure 7:
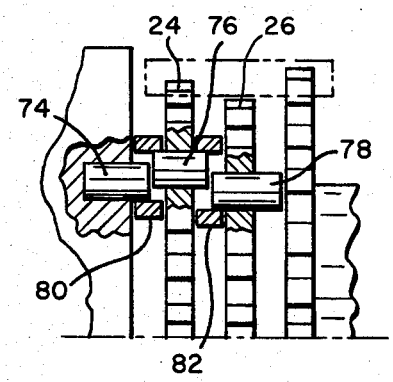
FIG. 7 is a detail view of still another embodiment of a driving interconnection of the gears.

FIGS. 6 and 7 show other embodiments of the pin assemblies. The device of FIG. 6 is similar to FIGS. 1 through 3 except that pins 34a and 38a are shorter than pins 34 and 38 and have some overlap. In the embodiment of FIG. 7 three separate pins 74, 76, and 78 are utilized, affixed to the torque plate 12, gears 24 and 26 respectively. Rings 80 connect pins 74 and 76, and rings 82 interconnect pins 76 and 78. This also will produce a gyratory motion of gears 24 and 26.

Figure 9:
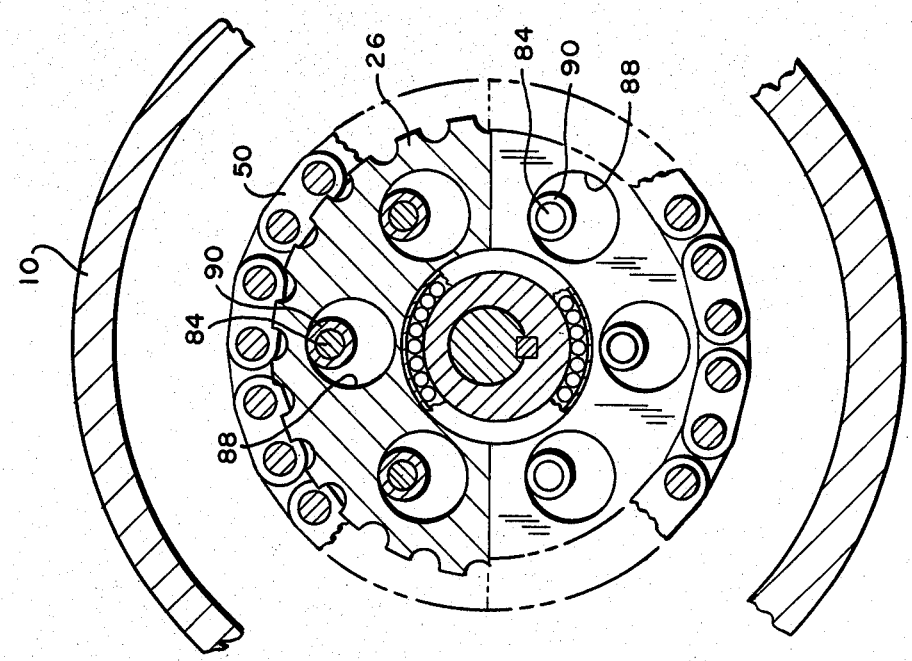
FIG. 9 is a sectional view taken substantially along the plane designated by line 9—9 of FIG. 8.
Figure 8:
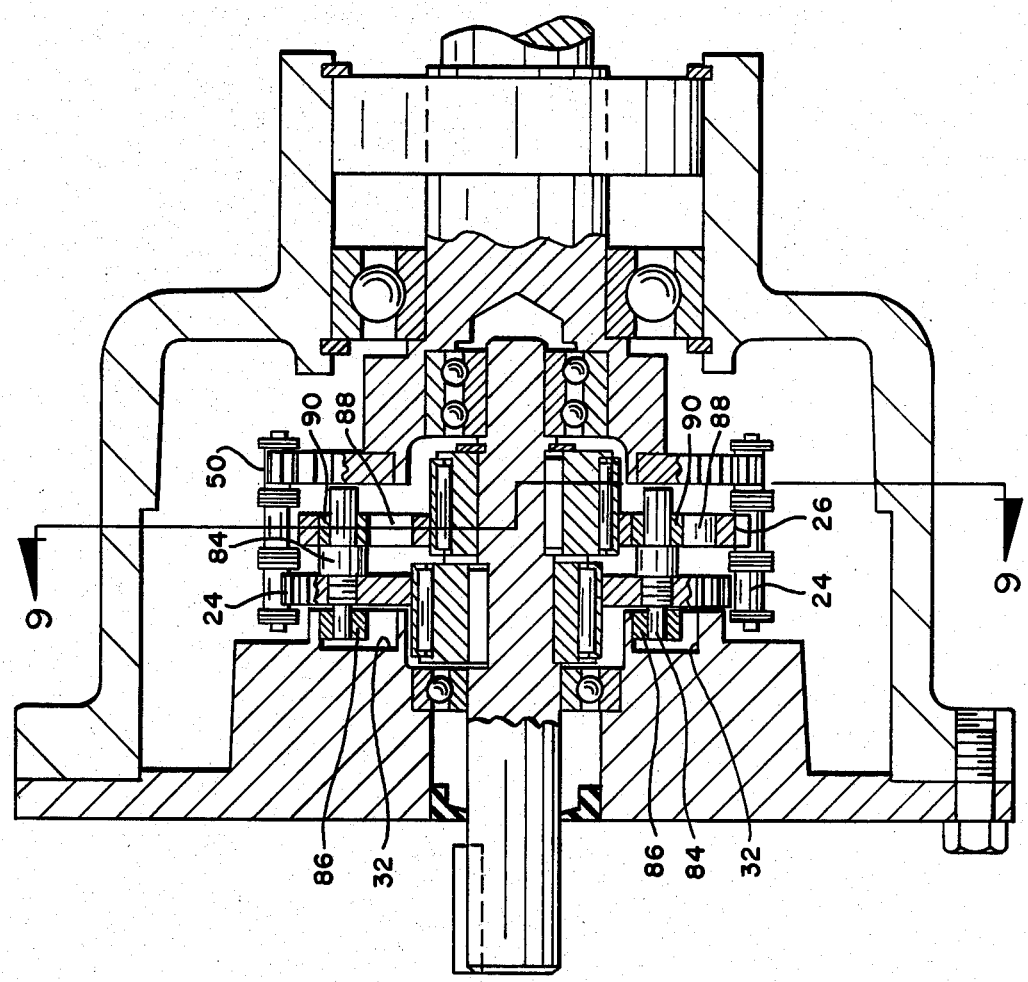
FIG. 8 is a longitudinal sectional view of yet another embodiment of this invention.

FIGS. 8 and 9 show yet another embodiment of the power transmission. In this embodiment gear 24 has six pins 84 threadably engaged and circumferentially arranged. One end of each pin mounts a bushing 86 disposed in one of the recesses 32. The other end of the pin extends through opening 88 in gear 26 and is surrounded by bushing 90 co-acting against the inner surface of opening 88. This configuration also produces a gyrating motion.

Figure 10:
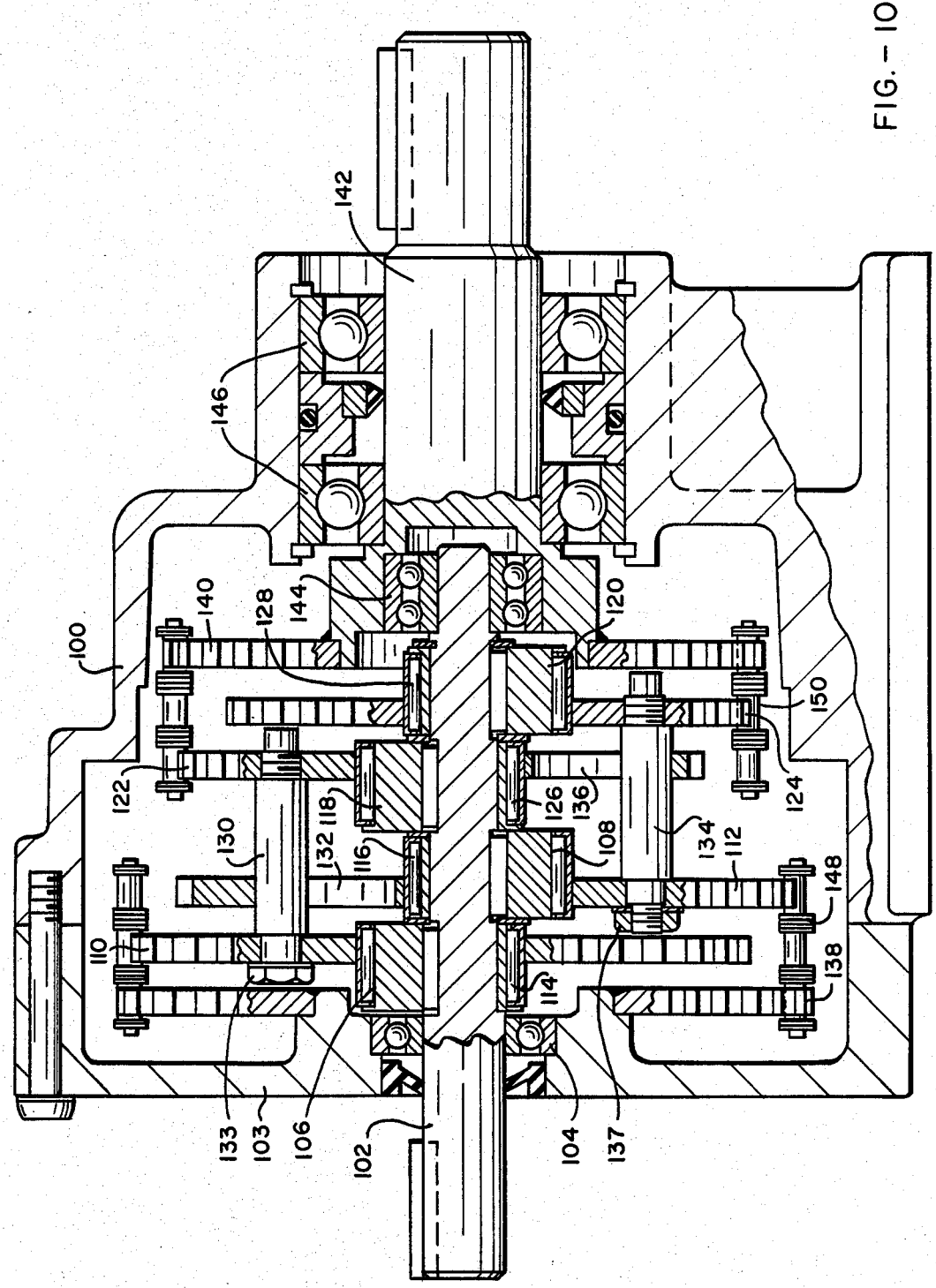
FIG. 10 is a longitudinal sectional view of a two chain embodiment of this invention.
Figure 11:
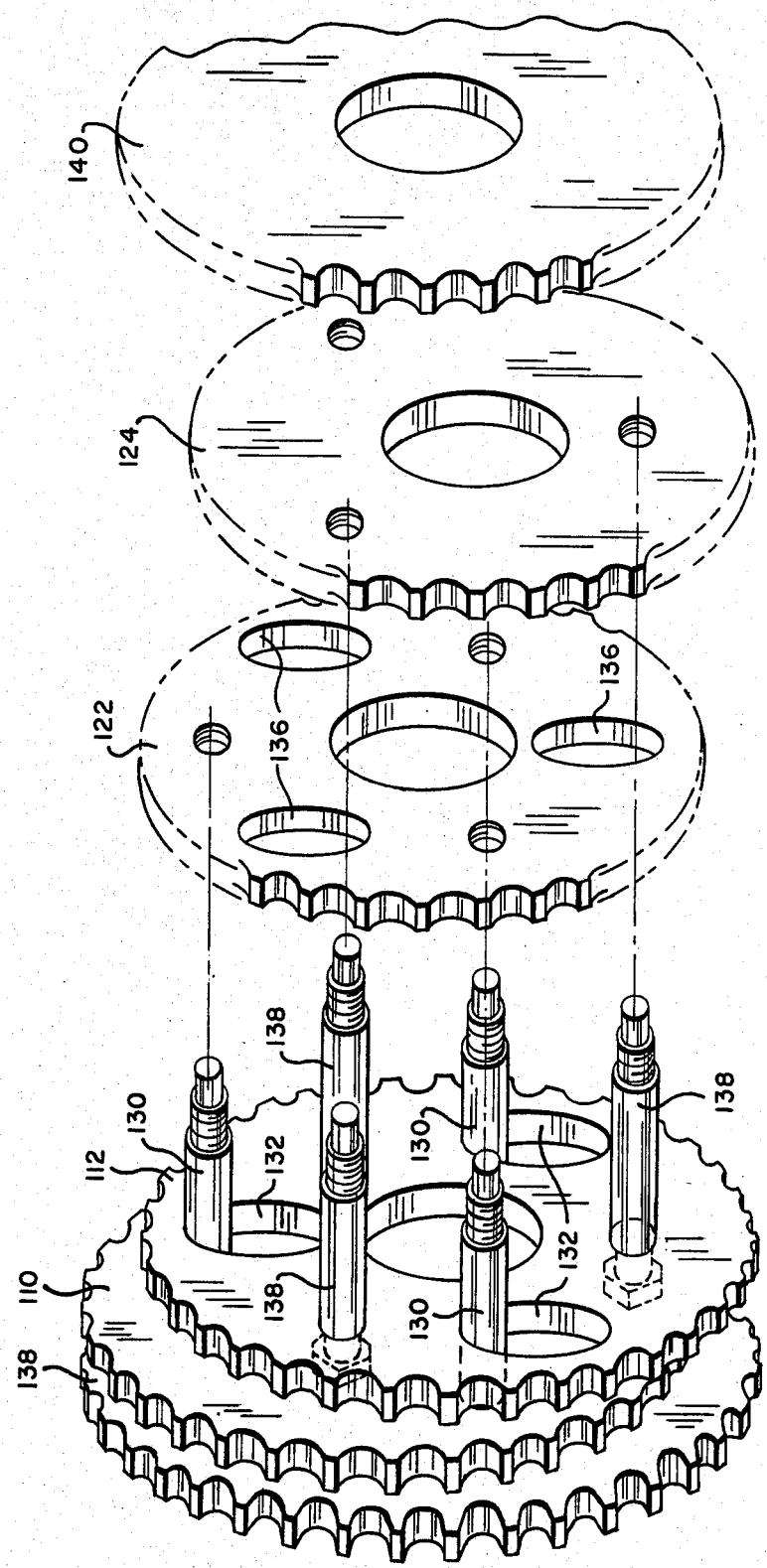
FIG. 11 is an exploded perspective view of the gears of FIG. 10.

FIGS. 10 and 11 show another embodiment which utilizes a double chain configuration. In this embodiment the housing 100 journals shaft 102 for rotation in end plate 103 on bearing 104. In this case the shaft has a first pair of eccentrics 106 and 108 with opposite throws; i.e. spaced 180°. A first pair of gears 110 and 112 are journalled on the eccentrics by bearings 114 and 116 respectively. The shaft 102 also has a second pair of eccentrics 118 and 120 on which are journalled gears 122 and 124 respectively by bearings 126 and 128 respectively. A first set of three or more equally circumferentially spaced pins, bushings or fillets 130 are threaded into gear 122, pass through openings 132 and are secured to gear 110 by nuts 133. Similarly a second set of three equally circumferentially spaced pins 134 are threaded into gear 124, pass through openings 136, and are secured to gear 112 by nuts 137.

A torque plate 138 is rigidly secured to the end plate 103, and an output gear 140 is rigidly secured to output shaft 142 which, in turn, is journalled by bearings 144 and 146 respectively on the input shaft 102 and housing 100. A first strand of triple chain 148 connects gears 110, 112 and torque plate 138. A second strand of triple chain 150 connects gears 122, 124 and output gear 140.

In this embodiment pins 130 cause gears 110 and 122 to act as a unit and pins 134 cause gears 112 and 124 to act as a unit. Each of these two gear units, acting under the action of the eccentric and guided by openings 132 and 136, gyrate both with respect to each other and the centerlines of the shafts 102 and 142 to cause a torque to be transmitted to the output shaft 142 responsive to rotation of the input shaft 102.

What is claimed is:

1. In an epicyclic power transmission system the improvement which comprises,
   torque arm means,
   an input shaft journalled for rotation;
   a plurality of gear means including first and second gears axially spaced and eccentrically mounted on said input shaft with their throws essentially equally spaced, means interconnecting said gear means to said torque arm means including a first set of pin means connecting the torque arm means to one of said gears and a second set of larger pin means extending through said one of said gears and connecting said torque arm means to the other of said gears, said one of said gears having circular openings corresponding to said first and second sets of pins, said second set of larger pins each having first end portions secured to said torque arm and passing through said corresponding openings of said one of said gears and second end portions reduced in diameter from said first end portions, said second end portions of said second set of larger pins extending through said openings of said other gear and having bushing means mounted thereon and journalled in said openings in said other gear, said first set of pins having bushing means journalled in the corresponding openings in said one of said gears, said system preventing rotations of the eccentrically mounted gears about their own axis, while permitting gyration of their axis about a common axis, each pin in each set of pins being journalled in a bushing which bushing is mounted in a circular opening in its respective gear,
   and means connecting an output means and said gear means to rotatively drive said output means.

2. The invention as defined in claim 1 wherein a portion of the bushings in said one gear extends between that gear and the other gear.

* * * * *